United States Patent [19]

Goggins, Jr.

[11] 4,086,590
[45] Apr. 25, 1978

[54] METHOD AND APPARATUS FOR IMPROVING THE SLOWLY MOVING TARGET DETECTION CAPABILITY OF AN AMTI SYNTHETIC APERTURE RADAR

[75] Inventor: William B. Goggins, Jr., Locke Mills, Me.

[73] Assignee: The United States of America as represented by the Secretary of the Air Force, Washington, D.C.

[21] Appl. No.: 761,507

[22] Filed: Jan. 21, 1977

Related U.S. Application Data

[63] Continuation-in-part of Ser. No. 563,009, Mar. 27, 1975, abandoned.

[51] Int. Cl.$^2$ .................................................. G01S 9/02
[52] U.S. Cl. .................................................. 343/5 CM
[58] Field of Search ..................................... 343/5 CM

[56] References Cited

U.S. PATENT DOCUMENTS

| 3,228,028 | 1/1966 | Baum et al. | 343/5 CM |
| 3,603,992 | 9/1971 | Goggins, Jr. et al. | 343/5 CM X |
| 3,735,399 | 5/1973 | Sletten et al. | 343/5 CM X |
| 3,735,400 | 5/1973 | Sletten et al. | 343/5 CM X |

*Primary Examiner*—Malcolm F. Hubler
*Attorney, Agent, or Firm*—Joseph E. Rusz; Willard E. Matthews, Jr.

[57] ABSTRACT

Detection of slowly moving and stationary targets that are normally obscured by ground clutter is accomplished by an AMTI synthetic aperture radar system that utilizes multiple receiving antennas mounted along the flight velocity vector of the radar bearing aircraft. Each antenna is separated by a distance $d$ from each other. Synthetic arrays are formed by processing the radar returns from each antenna terminal. The radar PRF is controlled so that the aircraft flies a distance $d$ during the interpulse period. The synthetic array outputs of adjacent pairs of antennas are subtracted to provide clutter cancellation. The resulting outputs from adjacent terminals can be used in a monopulse mode for angular discrimination.

7 Claims, 8 Drawing Figures

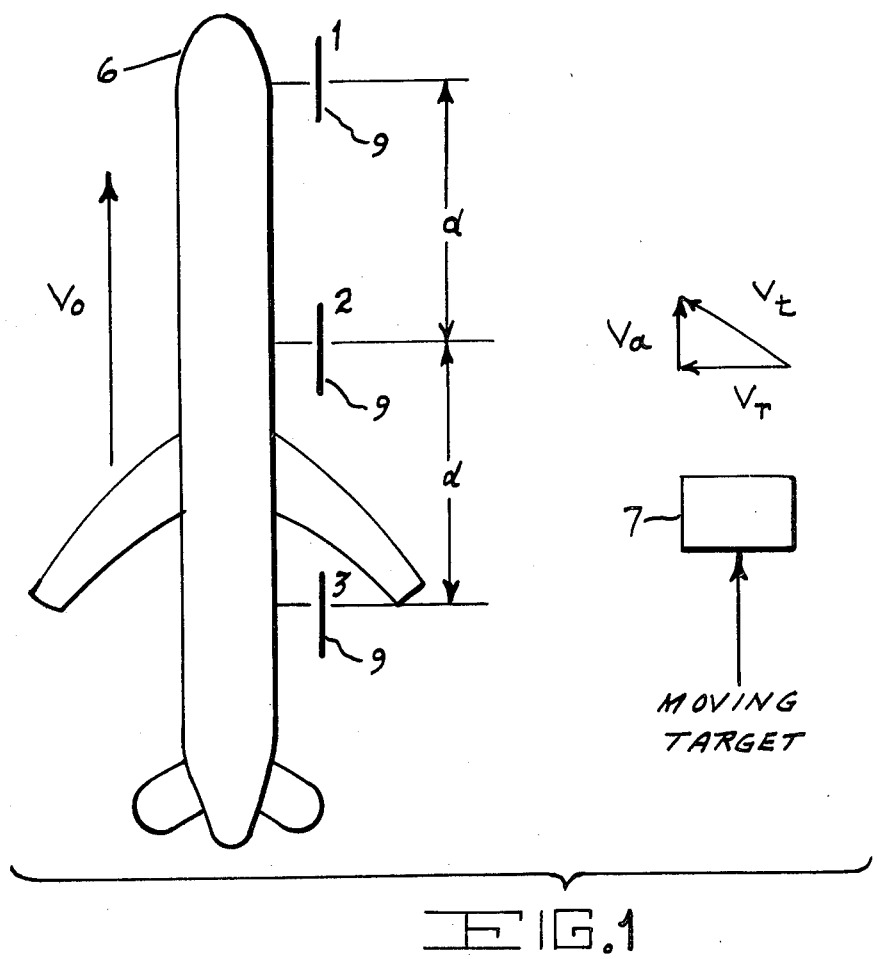
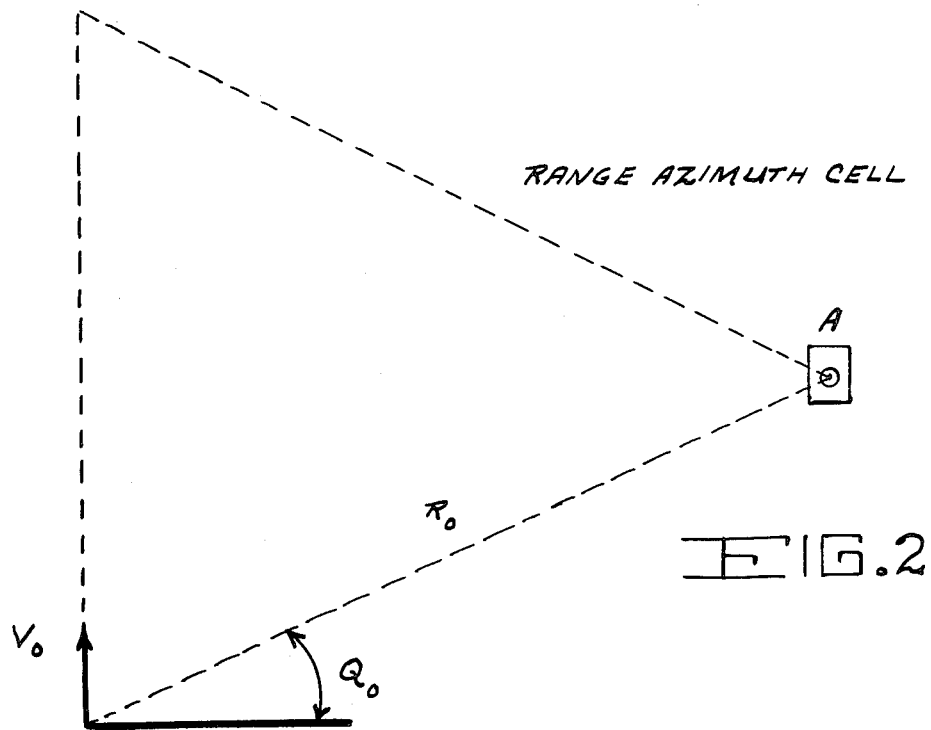
FIG.1
FIG.2

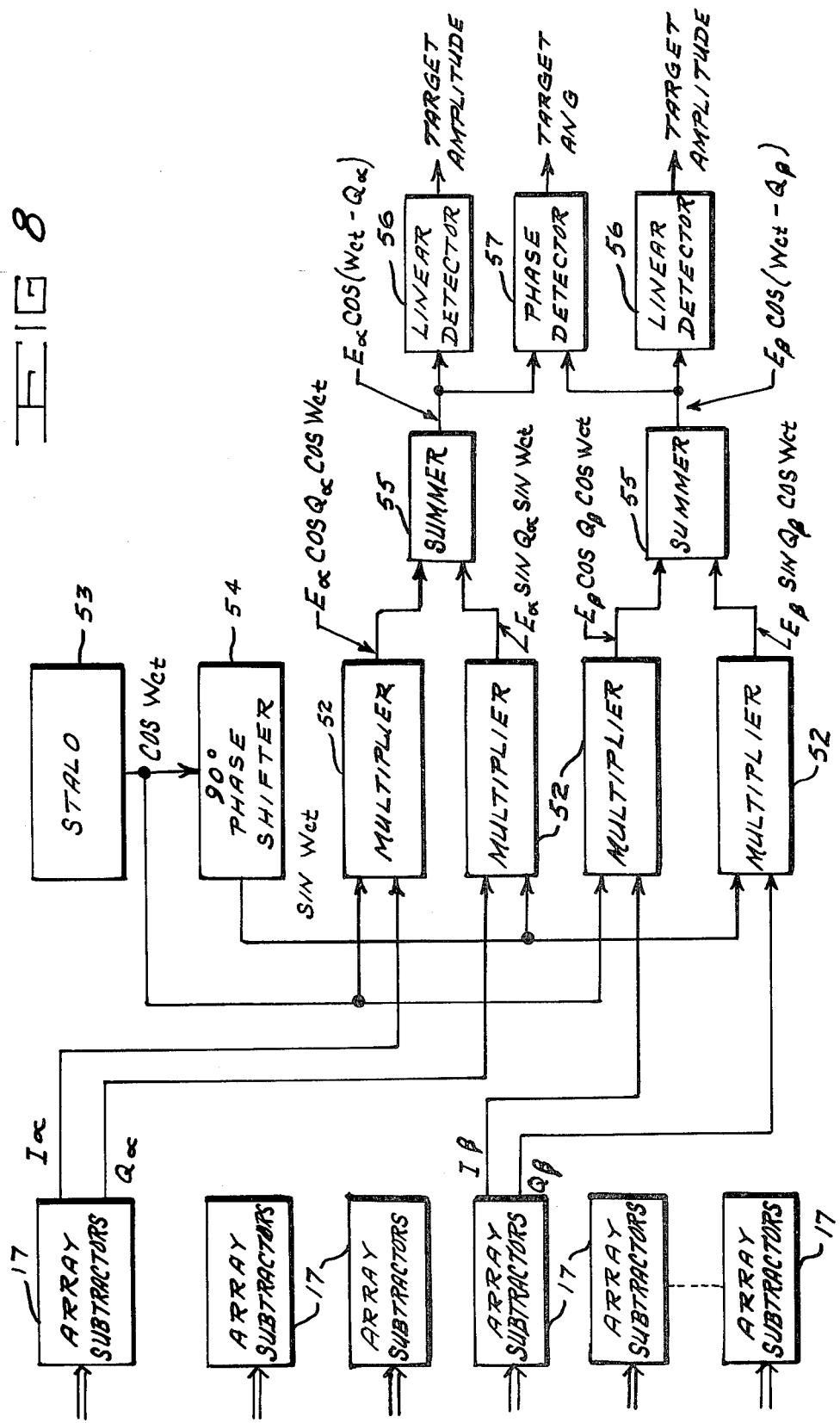

METHOD AND APPARATUS FOR IMPROVING THE SLOWLY MOVING TARGET DETECTION CAPABILITY OF AN AMTI SYNTHETIC APERTURE RADAR

STATEMENT OF GOVERNMENT INTEREST

The invention described herein may be manufactured and used by or for the Government for governmental purposes without the payment of any royalty thereon.

REFERENCE TO RELATED APPLICATIONS

This is a continuation-in-part of Patent Application Serial No. 563,009 of William B. Goggins, Jr., filed 3/27/75, entitled Method and Apparatus for Improving the Slowly Moving Target Detection Capability of an AMTI Synthetic Aperture Radar, now abandoned.

BACKGROUND OF THE INVENTION

This invention relates to AMTI synthetic aperture radar systems, and in particular to means for improving the slowly moving target detection capability of such systems.

Stationary and slowly moving targets that are concealed in foliage often go undetected by conventional airborne radar systems. This is especially true of targets whose clutter spectrum is within that of the ground clutter spectrum seen by the aircraft radar. Clutter reduction using multiple element physical antenna arrays is virtually impossible due to the antenna size required for operation in a suitable frequency range (20 – 200 MHz, for example). Furthermore, the use of physical antenna arrays for clutter reduction implies the use of exactly matched antenna elements.

The locating and tracking of moving targets in ground clutter by an airborne synthetic aperture radar system has been disclosed by Sletten et al in U.S. Pat. No. 3,735,400 issued May 22, 1973. Such a system, however, employs very complex circuitry and requires signal filtering by a multiplicity of narrow band channels and the integrating of many echoes following each filter in order to achieve effective antenna gain and signal directivity. Although radar systems of the type disclosed by Sletten et al provide improved target detection capabilities, there yet remains the need for more effective, simplified systems that can operate in a monopulse mode and that can simultaneously detect various targets travelling at different velocities. The present invention is directed toward satisfying such a need.

SUMMARY OF THE INVENTION

The invention comprehends adapting an AMTI synthetic aperture radar to clutter cancelling and monopulse modes of operation in order to detect stationary and slowly moving targets that are normally obscured in ground clutter. Three receiving antenna elements are spaced at equal distances along the flight velocity vector of the radar bearing aircraft. The radar is pulsed at a PRF that is related to the aircraft velocity and the antenna element spacing in a way that permits each antenna element to view a target from the same aspect angle. The outputs of adjacent pairs of elements are differenced to eliminate ground clutter and detect targets, and the differenced signals are processed by monopulse circuits to acquire target angle information. Multiple synthetic aperture arrays are utilized to provide simultaneous detection of targets traveling in different discrete velocity ranges.

It is a principal object of the invention to provide a new and improved AMTI synthetic aperture radar.

It is another object of the invention to provide a method for improving the slowly moving target detection capability of an AMTI synthetic aperture radar.

It is another object of the invention to provide means for improving the slowly moving target detection capability of an AMTI synthetic aperture radar.

It is another object of the invention to provide an effective, simplified AMTI synthetic aperture radar that is capable of detecting stationary and slowly moving targets of the type that are mormally hidden in ground clutter from conventional radar systems.

These, together with other objects, features and advantages of the invention, will become more readily apparent from the following detailed description when taken in conjunction with the accompanying drawings wherein like elements are given like reference numerals throughout.

DESCRIPTION OF THE DRAWINGS

FIG. 1 is an illustrative drawing showing the relationship of an AMTI synthetic aperture radar bearing aircraft and a slowly moving target;

FIG. 2 illustrates the flight velocity vector of an aircraft and its relationship to the range azimuth cell of a slowly moving target;

FIG. 8 is a block diagram illustrating one channel of a phase monopulse network suitable to use in the invention.

DETAILED DESCRIPTION OF THE PREFERRED EMBODIMENT

Figure 3:
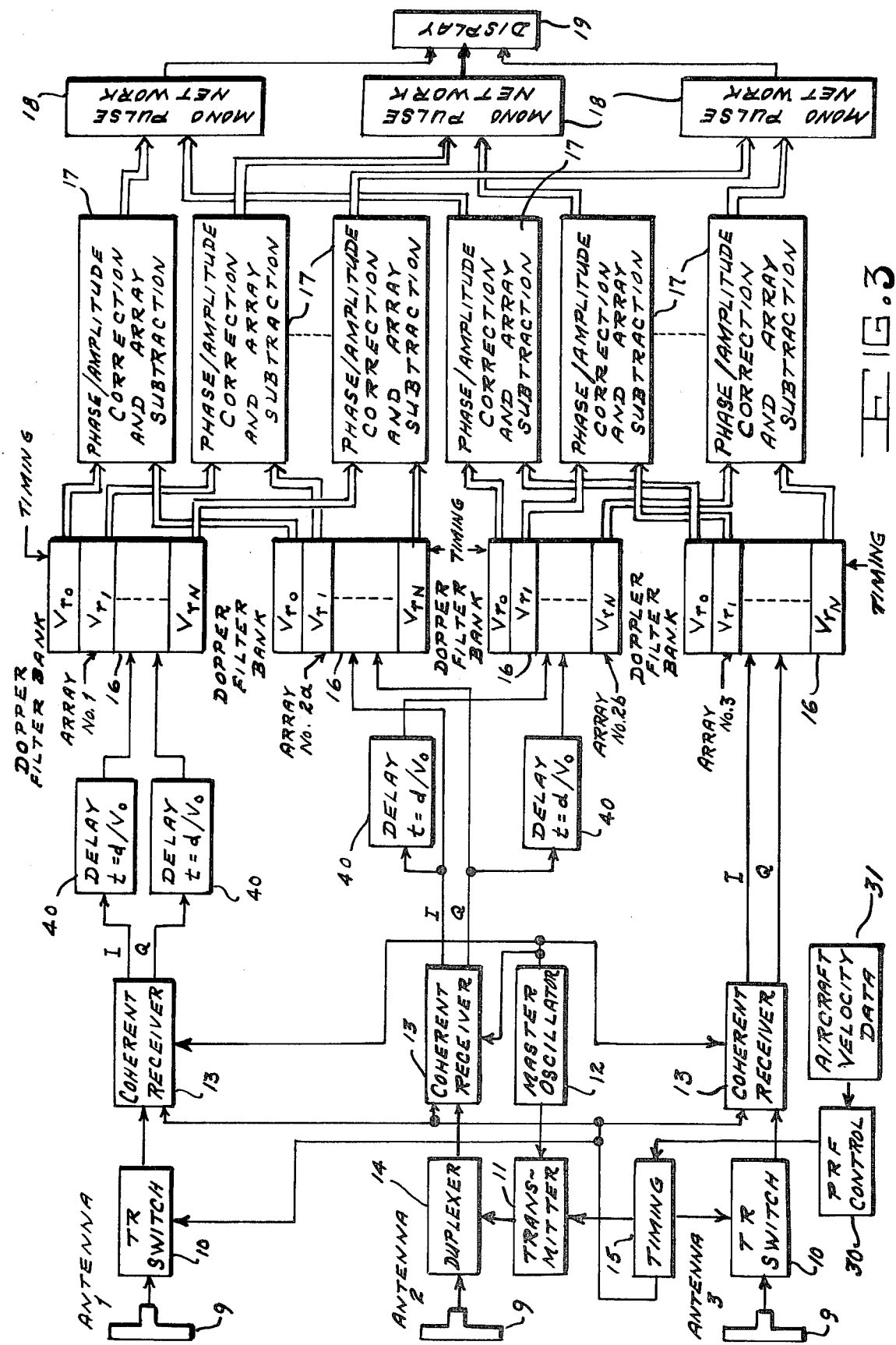
FIG. 3 is a block diagram of an AMTI synthetic aperture radar that incorporates the principles of the present invention.

The invention comprehends an AMTI synthetic aperture radar system having multiple receiving antennas as illustrated by antenna elements 9 of FIG. 1. The elements are spaced at equal distances $d$ along the flight velocity vector $V_o$ of the radar bearing aircraft 6. an AMTI synthetic aperture radar incorporating principles of the invention is illustrated in block diagram form in FIG. 3. Having reference thereto, antenna elements 9 are connected to coherent receivers 13 through transmit-receive switches 10 and duplexer 14. Timing circuit 15 controls the switching for transmitting and receiving modes of operation. Master oscillator 12 sets system frequency and the transmitter 11 is pulsed by pulse repetition frequency (PRF) control 30. The transmitted signals are pulsed at a PRF that is a function of the distance between antenna elements and aircraft velocity vector values from the aircraft velocity data source 31. The outputs of coherent receivers 13 are processed by synthetic aperture processing circuits consisting of doppler filter banks 16. The outputs of adjacent pairs of synthetic aperture processing circuits are differenced by array subtractor circuits 17. Monopulse networks 18 process the differenced signals. Monopulse networks 18 are connected to deliver target angle information to display 19.

Operation of the above described AMTI synthetic aperture radar can best be understood from the following description having particular reference to FIGS. 1 and 2.

The aircraft 6 of FIG. 1 whose three antenna elements 9 are mounted facing broadside to the flight path and separated by a distance $d$ is taken as moving at a constant velocity $V_o$. A moving target 7 is located at a point which is broadside to the aircraft, i.e., at a point perpendicular to the velocity vector $V_o$. Target 7 is assumed to have a velocity $V_t$ which is resolved into components $V_a$ and $V_r$ which are parallel and perpendicular to $V_o$, respectively. Pulses with pulsewidth $\tau$ are transmitted with a pulse repetition frequency $1/T$. $T$ is the interpulse period. In accordance with the principles of the invention $T = (d/V_o)$.

FIG. 2 shows the fundamental geometry associated with the invention. Range azimuth cell is located at angle $\theta_o$ and range $R_o$ from the aircraft which is moving at velocity $V_o$. The radar operates at carrier frequency $w_o = 2\pi C/\lambda°$.

The return from a stationary scatterer within the range azimuth cell if the transmitted wave is $$T(t) = E e^{j w_o t} \quad (1)$$

will be $$R(t) = E' e\delta(w_o t - 4 R_o/\lambda + \frac{4\pi V t o \sin \theta_o}{\lambda} - \frac{2\pi V^2 t^2 \cos^2 \theta_o}{\lambda R_o}) \quad (2)$$

In the above equation E' contains the phase and amplitude characteristics of the scatters as well as the range dependent attenuation in the radar equation.

Let us consider for the moment the case where $V_o^2 t^2 << \lambda R_o$ so that the last phase term in equation (2) is zero. If we consider range azimuth calls which are initially broadside to the aircraft sin $\theta_o$ will equal zero and the second term of (2) may be discarded. Thus the synthetic array for a broadside array may be formed by adding the returns from N successive pulses without any phase correction. Four identical synthetic arrays Nos. 1, 2a, 2b, and 3 are formed using each of the three antenna elements of FIG. 1. The flight of the aircraft causes Antenna No. 1 to be ahead of 2a by $t_o = d/V_o$. Thus, the signals from No. 1 antenna must be delayed by this amount to permit proper time registration of the arrays. The same is true with antennas 2b and 3. Accordingly, the arrays are formed so that No. 2a is delayed from No. 1 by an amount $t_o = d/V_o$ and No. 3 is delayed from No. 2b by the same amount. This is accomplished by inserting delay means 40 into the I and Q circuits from antennas 1 and 2. Array No. 2b is formed at the same time as array No. 1. The result is that the synthetic arrays No. 1 and 2a will be looking at exactly the same area on the ground but at a slightly different time. If array No. 2a is subtracted from array No. 1 zero return will result as long as there are no moving targets present since both are looking at exactly the same area and from the same aspect angle. If a target is present moving at a velocity $v_t$ having a radial component $V_r$ it will result in a phase change $V_r t_o$ between the two arrays. Thus when the subtraction is performed a residue will result which will be detected as a target.

Targets which are moving too fast will cause difficulty for this system as it has been herein described. If a target radial velocity, in this case call it $V_r$, is such that it produces a phase change of more than 90° in its returns over the time of the synthetic array part or all of the energy from the moving target will be cancelled. This may be overcome by forming a second synthetic array which will be sensitive to targets with velocity $V_r$. This is accomplished by phase shifting the outputs of the array with a phase $4\pi V_r/\lambda$ which is essentially equivalent to doppler filtering at a frequency $$w = \frac{4\pi V_r}{\lambda}.$$

This will result in the synthetic array main beam being squinted forward at an angle $$\theta = \sin^{-1} V_r/V_o$$

However, the returns from any target in the physical antenna beam with velocity at or near $V_r$, will be peaked up by the main beam of the synthetic array. Even in this case, however, subtraction of the arrays from any two adjacent physical antennas will result in the cancellation of nonmoving targets since they will be seen from exactly the same position but at a different time. However, the return from a moving target will result in a residue since the return will have a different phase in each array since it is seen at a slightly later time by the second array.

In a similar manner additional subarrays composed of doppler filters at higher frequencies may be built for targets at still higher speeds.

The use of synthetic arrays solves an additional problem which occurs in this clutter cancellation technique. In order to cancel the clutter properly it is necessary to carefully match both the phase and amplitude of the antenna pattern illuminating the ground. This is often difficult to do using physical antennas. With a synthetic array, however, the matching may be done in the processing after the array formation. At this point differences in the physical antenna pattern at the angle at which the array is directed can be corrected independent of other angles.

As thus far described the system will still not locate the moving targets in angle. One way this can be accomplished is to use either a phase or amplitude monpulse technique.

Basically the phase monopulse technkque depends on viewing the target at exactly the same time but with radar systems displaced in space but with overlapping patterns and comparing the phase of the two radar returns. The difference in phase of the return to each system will be dependent on the angle the target forms with the baseline of the two radar antennas.

The amplitude monpulse technique employs two partially overlapping antenna patterns. Processed signals from the two antenna patterns are added and subtracted to form a sum and difference which are combined in a phase detector to produce an error signal which is a function of target angle.

Either of these techniques can be incorporated into the system by the use of a third antenna. Exactly the same functions are performed between antennas 2 and 3 as are performed between 1 and 2 at exactly the same time. The outputs of each of the two systems are then compared either in phase or amplitude monopulse circuits to obtain angular information on the moving targets.

Figure 5:
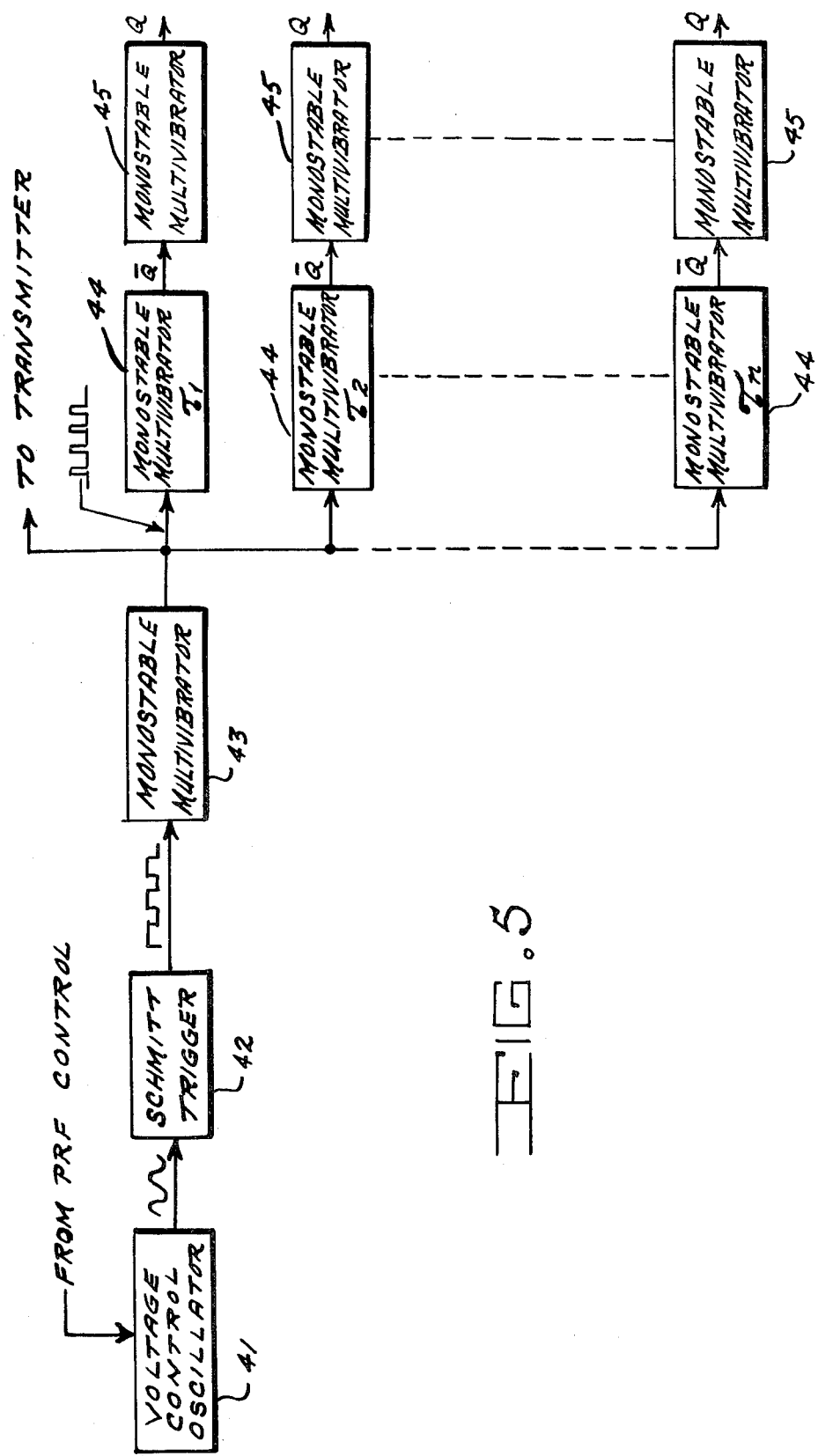
FIG. 5 is a block diagram of the timing circuit of the radar of FIG. 3.

Referring now to the embodiment of the invention shown in FIG. 3, a highly stable narrow spectrum frequency is developed in the master oscillator 12 and transmitted over antenna 9 after being pulse modulated and amplified by transmitter 11. A duplexer 14 routes the energy to the antenna and protects receivers 13 from burnout. TR switches 10 protect the other two receivers 13 from burnout by disconnecting them from the antennas while the transmitter is on. The patterns of these antennas should be as much alike as possible. The received signal goes through the antennas and is processed by the coherent receivers 13. Timing circuit 15 consists of pulse forming networks and delays. These can be provided by monostable multivibrators, for instance. A group of such pulses must also be provided to the coherent receivers 13 (the range pulses of FIG. IV). An example of such a timing circuit is shown in FIG. 5. A PRF control voltage representing aircraft velocity from PRF control 30 controls the frequency of voltage controlled oscillator 41. The output of this is fed to Schmitt trigger 42 to produce a square wave. This feeds monostable multivibrator 43 which produces pulses of the proper width to key the transmitter 11. These pulses also trigger monostable multivibrators 44. The time constants of these are adjusted to provide the proper delay $\tau_m$ for other timing pulses required by the radar system. By using the inverted ($\bar{Q}$) outputs such monostable multivibrators can be used to trigger a second group of monostable multivibrators 45 as shown. The time constant of the second monostable provides the proper pulsewidth for the timing pulse.

Figure 4:
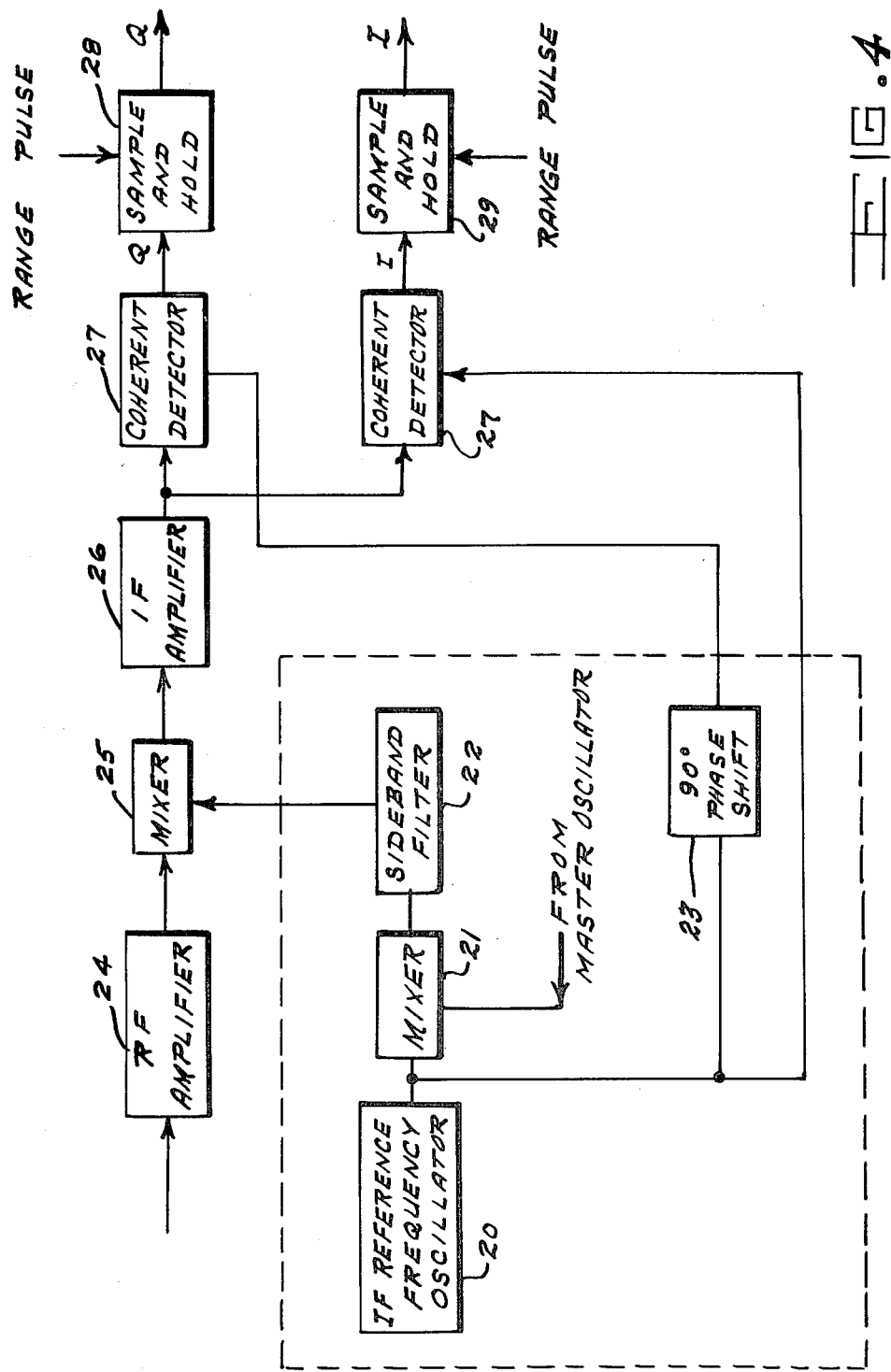
FIG. 4 is a detailed block diagram of one coherent receiver stage of the radar of FIG. 3.

FIG. 4 is a block diagram of a coherent receiver 13. The portion in the dotted lines may be common to all three receivers to economize equipment. An IF frequency oscillator 20 generates a reference IF frequency for the receiver. This signal is mixed with a signal from the master oscillator in order to produce the sum and difference frequency. Either the upper or lower sideband is selected by the sideband filter 22. The incoming radar return is amplified by the RF amplifier 24 and mixed with the reference frequency from the sideband filter 22 to produce the IF signal which is amplified by the IF amplifier 26. The amplified signal from the IF amplifier 26 is demodulated in the coherent detectors 27 by comparing it with the signal from the IF reference frequency oscillator 20 and this signal phase shifted by 90°. This generates in phase and quadrature signals. These two signals are necessary since it is possible that the phase of the radar return could be in quadrature or nearly so with the reference frequency. With only the in phase channel it is possible the return would not be detected. Both channels then go to the sample and hold circuits 28, 29 where they are sampled at a time after the transmitted pulse corresponding to the range at which one is looking for a target. In an actual radar a sample for each increment of range in a predetermined range switch would be generated. However, for simplicity of explanation only one such sample is shown. The sample and hold circuits 28, 29 also collapse the spectrum of the received signals so that its energy is contained at or near DC. Thus the signals can be efficiently processed by the doppler filter bank.

The synthetic arrays are formed by the doppler filter banks. As indicated above, two arrays are formed with the signals from antenna No. 2. One array is delayed by $t_o$ from that of antenna No. 1 and subtracted from the array of antenna No. 1 for clutter cancellation. The other array is formed at exactly the same time as that of antenna No. 1. An array from antenna No. 3 delayed by $t_o$ from this second antenna No. 2 array is then subtracted from it for clutter cancellation between antenna No. 2 and antenna No. 3.

Phase and amplitude corrections for differences in the physical antenna patterns are made and the arrays subtracted for clutter cancellation the next set of circuits. The residues of the subtractions are then compared in the monopulse circuits for angle determination of the targets and the results displayed.

Figure 6:
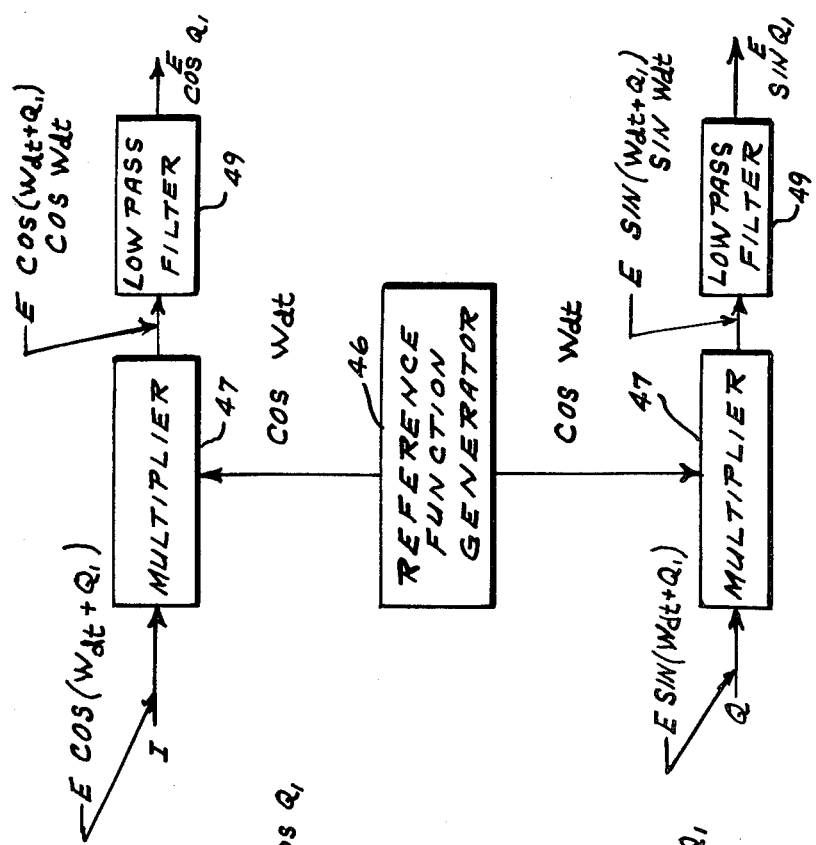
FIG. 6 is a block diagram illustrating one method of doppler filtering suitable to use in the invention.
Figure 7:
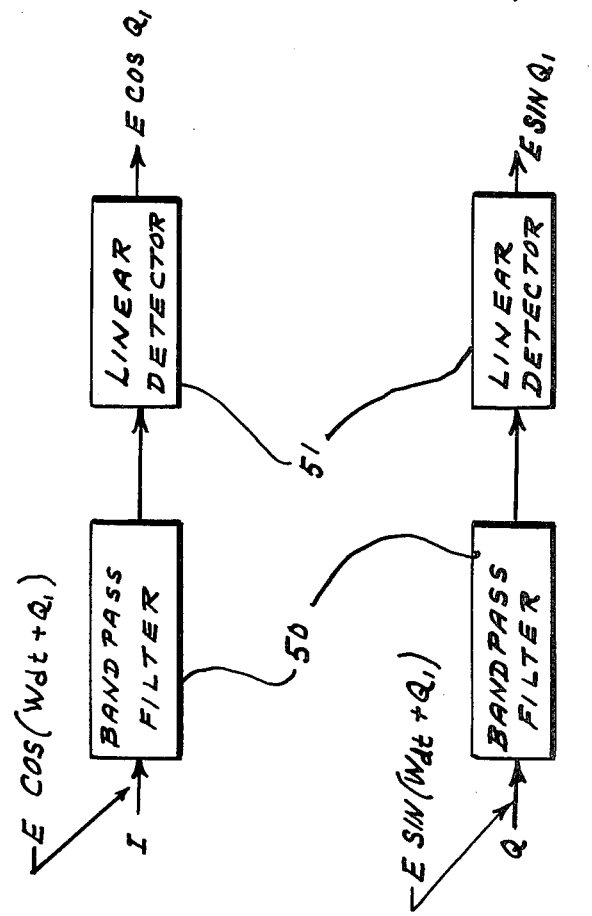
FIG. 7 is a block diagram illustrating a second method of doppler filtering suitable to use in the invention.

Synthetic aperture processing can be performed by doppler filter banks in the form of unfocused processing. Equation (2) shows the doppler and doppler rate terms of the return signals. The $4\pi Vt \sin\theta_o/\lambda$ term is the doppler term. The $2\pi V^2 t^2 \cos\theta_o/\lambda R_o$ is the doppler rate term of the focusing term of synthetic aperture processing. If the integration time of synthetic aperture processing is sufficiently short, the doppler rate term will be small and may be neglected. Thus ordinary doppler filters of proper bandwidth can accomplish unfocused synthetic aperture processing. This is sometimes termed doppler beam sharpening. There are several methods to perform this filtering. One method illustrated by FIG. 6 is to generate a reference function in function generator 46 which in this case is a sine wave at the doppler frequency one is detecting. This sine wave then multiplies in multiplier 47 both I and Q channels and the result passes through low pass filters 49. The low pass filter 49 removes the AC component leaving the signal shown. Another method is to use a low pass filter or a band pass filter 50 followed by a linear detector 51 as shown in FIG. 7. Any type of low pass or bandpass filter as required could be used provided it could be built with the proper bandwidth and center frequency. Each filter in the bank would have to process both I and Q channels and thus would require two identical filters. The outputs of these filters would be in phase (I) and quadrature (Q) which are simple voltages dependent on the magnitude of the scattering at the particular doppler frequency signals at the amplitude of this scattering whose doppler frequency is at the particular center frequency of the filter. This scattering is due to stationary targets (clutter) at angle $\theta_0$ and to moving targets. It is the clutter that is to be cancelled and the moving targets that are to be preserved. It should be recognized that each doppler filter has a narrow but finite (versus infinitesimal) bandwidth and that scattering from the ground over a narrow range of angles will be passed by the doppler filters.

It should be recognized that because the antennas must be in the vicinity of one another and are placed on aircraft that identical antenna patterns will not be possible. For proper clutter cancellation, the contribution by each antenna must be identical in phase and amplitude. Due to the doppler beam sharpening, however, only a small portion of the antenna pattern will contribute significantly to the output of the doppler filter. The phase and amplitude contribution of the antenna over this small angular portion will be almost constant and if there is a difference between the two antenna patterns in phase and/or amplitude these can be corrected for by correcting the phase and amplitude at the output of the doppler filters. This is done in phase/amplitude correlation and array subtraction circuits 17 by scaling the I and Q outputs of the doppler filters. The scaling can be accomplished with any circuit such as an attenuator or amplifier whose loss or gain can be adjusted.

The outputs of these scalors are simple time varying voltages. Array subtraction can be accomplished using a separate differencing circuit on both I and Q channels. The result will be for each array subtraction process I and Q difference signals. A differential unity gain amplifier would be a suitable circuit to use for array subtractions.

The monopulse function can be accomplished by a technique similar to that described in U.S. Patent Ser. No. 3,603,992, of William B. Goggins, Jr., et al, "Dual Harmonic Synthetic Aperture Radar". As described in the application, there are basically two techniques, phase monopulse and amplitude monopulse. The phase monopulse technique will be described first. Basically in the phase monopulse technique returns from antennas that are a distance $d$ apart from one another are compared in phase. The output of the phase comparison is a voltage that is dependent on the phase difference between the two signals which in turn is a function of the angular bearing of the target to the perpendicular bisector of the baseline between the two antennas. As in all monopulse systems, the accuracy of measurement of this angle is best when the signal-to-noise or signal-to-clutter ratio of the target return is high. For ease of understanding, one channel of the phase monopulse network is shown in FIG. 8. The outputs of the first and fourth array subtractors are labeled $I_\delta$, $Q_\delta$, and $I_\beta$, $Q_\beta$, respectively. These are given by $$I_\delta = E_\delta \cos \theta_\delta \quad Q_\delta = E_\delta \sin \theta_\delta$$

$$I_\beta = E_\beta \cos \theta_\beta \quad Q_\beta = E_\beta \sin \theta_\beta.$$

It is desired to determine $E_\delta$, $E_\beta$, and $\theta_\delta - \theta_\beta$ if the channels are matched $E_\delta \simeq E_\beta$. The I and Q channels are multiplied (modulated) by multipliers 52 by the in phase and quadrature components of the output of stable oscillator 53 that operates at a convenient frequency. The 90° phase shifter 54 provides the quadrature component. This frequency will be such that the response of the multipliers 52, summers 55, linear detectors 56 and phase detector 57 will be optimum. The outputs of the multipliers 52 are given by $$E_\delta \cos \theta_\delta \cos w_c t = E_\delta/2 \; [\cos(w_c t - \theta_\delta) + \cos(w_c t + \theta_\delta)]$$

and $$E_\delta \sin \theta_\delta \sin w_c t = E_\delta/2 \; [\cos(w_c t - \theta_\delta) - \cos(w_c t + \theta_\delta)]$$

Summing the above two signals yields $$E_\delta \cos \theta_\delta \cos w_c t + E_\delta \sin \theta_\delta \sin w_c t = E_\delta \cos(w_c t - \theta_\delta)$$

Likewise the output of the 2b summer is $E_\beta \cos(w_c t - \theta_\beta)$.

If these two signals are fed into a phase detector that is not amplitude sensitive the difference angle $\theta_\delta - \theta_\beta$ is obtained which is a measure of the target angle with respect to broadside. There are two target amplitude signals which should be approximately equal and could be averaged in the display to increase the signal-noise/signal-clutter ratios. The amplitude monopulse function uses a similar processing technique to obtain the necessary signals. In amplitude monopulse the sum ($\Sigma$) and difference ($\Delta$) signals from the two channels are formed. The sum signal gives the target amplitude. If the difference signal and the sum signal are compared in a phase detector, the result is a voltage that is dependent on target angle. The processing up to the output of the first set of summers is the same as described above with reference to FIG. 8. The remaining processing is that which is commonly used in amplitude monopulse processing.

Any type of display system that could simultaneously display target angle, target range, target amplitude and target velocity would be suitable. One possibility would be to display these as $x$, $y$, brightness and color, respectively, on a color CRT tube. It should be understood that the data would have to go through an appropriate scan converter.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The method of detecting slowly moving targers with a pulsed AMTI synthetic aperture radar system having multiple receiving antenna elements comprising the steps of
    positioning said receiving antenna elements at equal separation distance $d$ along the flight velocity vector $V_o$ of the AMTI radar bearing aircraft,
    controlling the PRF of said radar to maintain an interpulse period T of $d/V_o$, and
    differencing the outputs of the synthetic aperture processing circuits of adjacent pairs of receiving antenna elements.

2. The method of detecting slowly moving targets as defined in claim 1 including the further step of
    processing the differenced outputs of said synthetic aperture processing circuits with monopulse circuits for target angle determination.

3. The method of detecting slowly moving targets as defined in claim 2 including the further step of
    providing simultaneous synthetic aperture processing means for targets travelling in a plurality of different discrete velocity ranges.

4. A pulsed AMTI synthetic aperture radar comprising
    a multiplicity of receiving antenna elements spaced at equal separation distances $d$ along the flight velocity vector $V_o$ of the radar bearing aircraft,
    aircraft velocity determining means,
    PRF control means responsive to said aircraft velocity determining means and adapted to maintain a radar system interpulse period T of $d/V_o$,
    synthetic aperture processing circuits connected to process received signals from said receiving antenna elements, and
    clutter cancelling means connected to difference the outputs of the synthetic aperture processing circuits of adjacent pairs of receiving antenna elements.

5. A pulsed AMTI synthetic aperture radar as defined in claim 4 including monopulse circuits connected to process the outputs of said clutter cancelling means.

6. A pulsed AMTI synthetic aperture radar as defined in claim 5 wherein said synthetic aperture processing circuits include multiple synthetic aperture arrays effective to simultaneously detect targets travelling in different discrete velocity ranges.

7. A pulsed AMTI synthetic aperture radar comprising first, second and third antenna elements spaced at equal distances $d$ along the flight velocity vector $V_o$ of the radar bearing aircraft, a radar transmitter connected to transmit radar signals through as least one antenna element, aircraft velocity determining means, PRF control means responsive to said aircraft velocity determining means and adapted to maintain a radar system interpulse period T of $d/V_o$, a coherent receiver connected to each antenna element, a first synthetic aperture processing circuit connected to receive radar return signals from the coherent receiver connected to said first antenna element, second and third synthetic aperture processing circuits connected to receive in parallel radar return signals from the coherent receiver connected to said second antenna element, a fourth synthetic aperture processing circuit connected to receive radar return signals from the coherent receiver connected to said third antenna element, a timing circuit, said timing circuit effecting the simultaneous formation of synthetic aperture arrays with said first and second synthetic aperture processing circuits and the simultaneous formation of synthetic aperture arrays with said third and fourth synthetic aperture processing circuits at a delayed time $t_o$ equal to $d/V_o$, a first array subtraction circuit connected to difference the outputs of said first and second synthetic aperture circuits, a second array subtraction circuit connected to difference the outputs of said third and fourth synthetic aperture circuits, and a monopulse circuit connected to process the outputs of said first and second array subtraction circuits.